United States Patent
Axell et al.

(10) Patent No.: US 9,992,675 B2
(45) Date of Patent: Jun. 5, 2018

(54) CHANGING IMS SUPPLEMENTARY SERVICE DATA IN AN IMS NETWORK

(71) Applicant: TELEFONAKTIEBOLAGET LM ERICSSON (PUBL), Stockholm (SE)

(72) Inventors: Jörgen Axell, Danderyd (SE); Jan Holm, Stora Skedvi (SE); Ivo Sedlacek, Hovorcovice (CZ)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 146 days.

(21) Appl. No.: 14/654,992

(22) PCT Filed: Apr. 29, 2015

(86) PCT No.: PCT/EP2015/059432
§ 371 (c)(1),
(2) Date: Jun. 23, 2015

(87) PCT Pub. No.: WO2016/173654
PCT Pub. Date: Nov. 3, 2016

(65) Prior Publication Data
US 2017/0142580 A1    May 18, 2017

(51) Int. Cl.
*H04W 12/00*    (2009.01)
*H04W 12/06*    (2009.01)
(Continued)

(52) U.S. Cl.
CPC ......... *H04W 12/06* (2013.01); *H04L 65/1016* (2013.01); *H04L 65/1063* (2013.01);
(Continued)

(58) Field of Classification Search
None
See application file for complete search history.

(56) References Cited

U.S. PATENT DOCUMENTS

| | | | |
|---|---|---|---|
| 8,230,003 B2 * | 7/2012 | Oh | .................... G06F 17/30011 709/203 |
| 2008/0104124 A1 | 5/2008 | Bao et al. | |

(Continued)

FOREIGN PATENT DOCUMENTS

| | | | | |
|---|---|---|---|---|
| WO | WO 2013143577 A1 * | 10/2013 | ........... | G06F 3/0481 |
| WO | 2015014388 A1 | 2/2015 | | |

OTHER PUBLICATIONS

Applied Cryptography by Bruce Schneier; Publisher: John Wiley Sons, Inc.; Year: 1996.*

(Continued)

*Primary Examiner* — Madhuri R Herzog

(57) ABSTRACT

A method of authenticating a request to change IMS supplementary service data stored at an application server within an IMS network. The method comprises sending from a user equipment to the application server a request for current IMS supplementary service data, on receipt by the user equipment of a response containing the IMS supplementary data in an XML configuration document, and an indication that an access code is required to change the supplementary service data. The method further comprises constructing an amended XML configuration document, incorporating the amended XML document into an Extensible Mark-up Language, XML, Configuration Access Protocol, XCAP, message, incorporating an access code into the XCAP message at a location external to the XML document, and transmitting the XCAP message from the user equipment to the application server.

21 Claims, 8 Drawing Sheets

(51) Int. Cl.
*H04L 29/06* (2006.01)
*H04L 29/08* (2006.01)

(52) U.S. Cl.
CPC .......... *H04L 65/1096* (2013.01); *H04L 67/02* (2013.01); *H04L 67/146* (2013.01)

(56) References Cited

U.S. PATENT DOCUMENTS

2010/0325556 A1 12/2010 Zhu
2015/0052422 A1 2/2015 Forsberg

OTHER PUBLICATIONS

Muswera, Walter T., and Alfredo Terzoli. "RUCRG IMS Client: Design and Implementation of Presence and XCAP." Publisher: Semantic Scholar; Year: 2012.*

Spiers, Richard, and Neco Ventura. "A Converged IMS Client for the IP Multimedia Subsystem." Southern Africa Telecommunication Networks and Applications Conference (SATNAC). 2010. (Year: 2010).*

Andreas Bachmann, Alice Motanga, and Thomas Magedanz. 2008. Requirements for an extendible IMS client framework. In Proceedings of the 1st international conference on MOBILe Wireless MiddleWARE, Operating Systems, and Applications ( MOBILWARE '08). ICST, Brussels, Belgium, Article 19, 6 pages (Year: 2008).*

ETSI TS 183 023 V1.3.1 Telecommunications and Internet converged Services and Protocols for Advanced Networking (TISPAN); PSTN/ISDN simulation services; Extensible Markup Language (XML) Configuration Access Protocol (XCAP) over the Ut interface for Manipulating NGN PSTN/ISDN Simulation Services, Nov. 26, 2007.

Rosenberg, J., "The Extensible Markup Language (XML) Configuration Access Protocol (XCAP)," Network Working Group, Request for Comments: 4825; May 2007.

* cited by examiner

CHANGING IMS SUPPLEMENTARY SERVICE DATA IN AN IMS NETWORK

This application is a 371 of International Application PCT/EP2015/059432, filed Apr. 29, 2015, the disclosure of which is fully incorporated herein by reference.

TECHNICAL FIELD

The present invention relates to changing IMS supplementary service data in an IMS network.

BACKGROUND

The Third Generation Partnership Project, 3GPP, has specified Multimedia Telephony services (MMTel) as a service framework used within converged cellular and fixed networks based on IP (Internet Protocol) technology and with the Session Initiation Protocol (SIP) as the signaling protocol. Associated with telephony services are a number of supplementary services such as call waiting, call diversion and call barring. Within MMTel, these services can be configured by the user using Hypertext Transfer Protocol (HTTP) over the Ut interface. In order to protect the configuration some services could need a password to allow configuration. As an example, a parent might pay for their children's subscriptions and want to bar some services, e.g. expensive services or services with adult content. In existing technology, such as GSM and 3G systems, a password can be used for such configuration.

In MMTel, the configuration data consists of a specified XML document with a standardized content. The configuration consists of manipulating this document using XCAP mechanisms as described in IETF RFC 4825.

There is currently no option for the provision of a password or personal identification number across the Ut interface between the user equipment and the application server. The obvious solution to the problem would be the inclusion of the password or PIN into the XML document. However, this leads to a problem in that everyone who has reading rights to the XML document would also have access to the password or PIN.

SUMMARY

Accordingly in a first aspect of the present invention, there is provided a method of changing IMS supplementary service data stored at an application server within an IMS network. The method comprises sending from a user equipment to the application server a request for current IMS supplementary service data. On receipt by the user equipment of a response containing the IMS supplementary data in an XML configuration document, and an indication that an access code is required to change the supplementary service data, the user equipment constructs an amended XML configuration document which incorporates the amended XML document into an Extensible Mark-up Language, XML, Configuration Access Protocol, XCAP, message. An access code is then incorporated into the XCAP message at a location external to the XML document and the XCAP message is transmitted from the user equipment to the application server.

Preferably, the method further comprises receiving at the application server the request for current IMS supplementary service data, providing in the response to the request the IMS supplementary data in an XML configuration document and an indication that an access code is required to change the supplementary service data. When the application server receives an XCAP message containing the amended XML document and an access code in a location external to the XML document, the access code is extracted from the XCAP message and the amended XML document is implemented, if the access code corresponds to a code required for changing the supplementary service data.

Preferably the access code is part of an HTTP header.

Preferably the access code is part of a Uniform Resource Indicator, URI.

Preferably the access code is part of the XCAP User Identity, XUI.

Preferably the access code is provided across a Ut interface.

Preferably, the service framework of the supplementary service is Multimedia Telephony Services.

Optionally the method further comprises storing a hash of the access code at the application server and, on receipt of an access code and comparing a hash of the received code with a hash of the stored code.

In a second aspect of the present invention, there is provided an apparatus for use in User Equipment, UE, in a communications network comprising an IMS network. The apparatus comprises processor circuitry, a storage unit storing instructions executable by the processor circuitry, a transmitter and a receiver whereby the apparatus is operative to send to an application server a request for current IMS supplementary service data and receive a response containing the IMS supplementary service data in an XML configuration document and an indication that an access code is required to change the supplementary service data. The apparatus is further configured to construct an amended XML configuration document, to incorporate the amended XML document into an Extensible Mark-up Language, XML, Configuration Access Protocol, XCAP, message, to incorporate an access code into the XCAP message at a location external to the XML document and to transmit the XCAP message from the user equipment to the application server.

In a third aspect of the present invention, there is provided user equipment comprising an apparatus according to the second aspect.

In a fourth aspect of the present invention, there is provided an apparatus for use in an application server, AS, in an IMS network. The apparatus comprises processor circuitry, a storage unit storing instructions executable by the processor circuitry, a transmitter and a receiver, whereby the user equipment is operative to receive a request from a user equipment for current IMS supplementary service data and to provide a response containing the IMS supplementary service data in an XML configuration document, and an indication that an access code is required to change the supplementary service data. The apparatus is further configured to receive an XCAP message containing an amended XML document and an access code located in the XCAP message external to the XML document, to extract from the XCAP message the access code and to implement the amended XML document, if the access code corresponds to a code required for changing the supplementary service data.

In a fifth aspect of the present invention there is provided an application server comprising an apparatus according to the fourth aspect.

In a sixth aspect of the present invention there is provided computer program, comprising instructions which, when executed on at least one processor, cause the at least one processor to carry out a method according to the first aspect of the invention.

In a seventh aspect of the present invention there is provided a computer program product comprising a computer program according to the sixth aspect of the invention.

In an eighth aspect of the present invention there is provided a carrier containing a computer program according to the seventh aspect of the present invention, wherein the carrier optionally includes an electrical signal, an optical signal, a radio signal, a magnetic tape or disk, an optical disk or a memory stick.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

In order to overcome the problems concerned with the use of the XML configuration file to hold the password or personal identification number, PIN, described above, a mechanism for transferring the password or PIN outside of the configuration document for the service is described. Reference will be made to an access code. Access code refers to a PIN or password, and can be any encodable sequence used for identification of a user.

Figure 1:
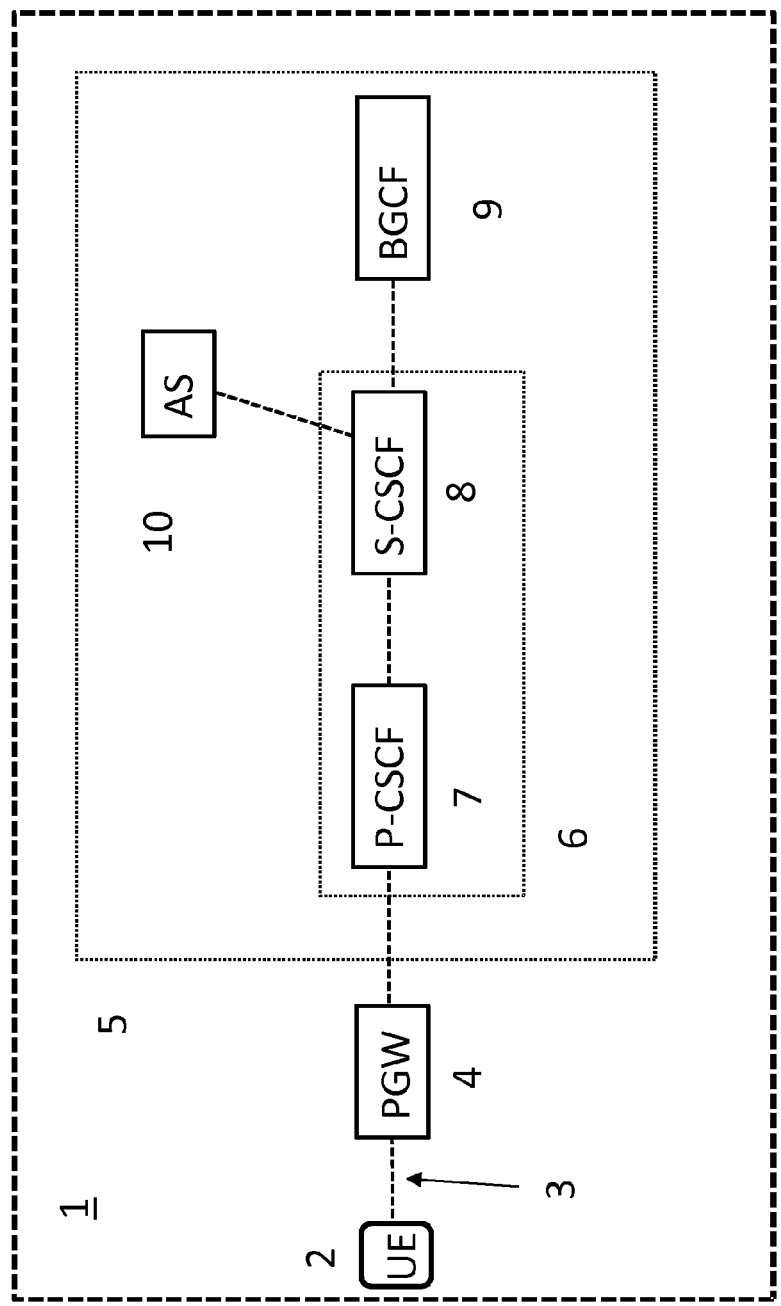
FIG. 1 is a schematic diagram of a typical network comprising an IP Multimedia Subsystem on which the present invention may be implemented.
Figure 2:
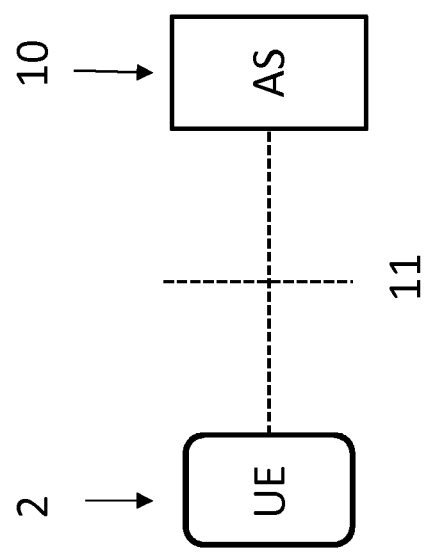
FIG. 2 is a schematic diagram of the Ut Interface.
Figure 3:
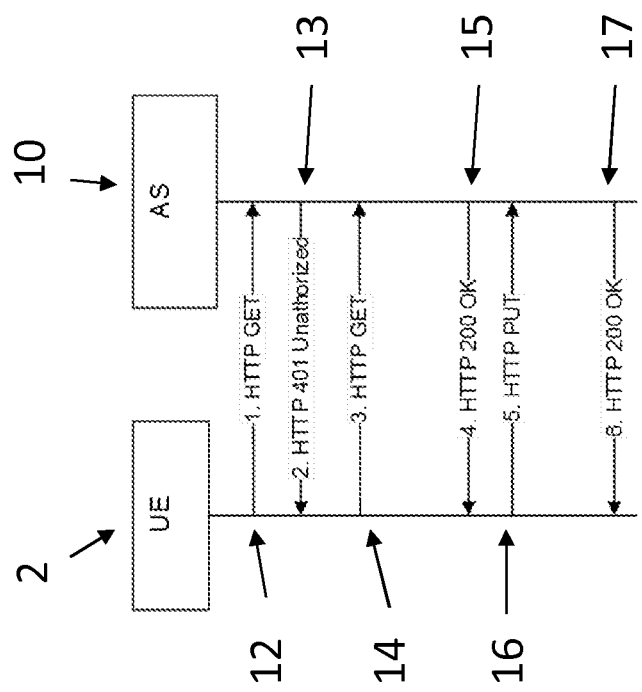
FIG. 3 is a signalling diagram showing the signalling between the user equipment and the application server across the UT interface.

The mechanism disclosed herein provides for an adaptation of the signaling messages conventionally used for changing the configuration of a supplementary service in an IMS network. The signaling conventionally comprises an XML configuration document incorporated into an XCAP message. The network nodes involved in the signaling, the logical interface over which the signaling is performed and the signaling sequence remain substantially unaltered. FIGS. 1, 2 and 3 respectively show the network layout, the logical interface and the signaling according to the prior art and used in an embodiment.

FIG. 1 is a schematic view of an Internet Protocol (IP) Multimedia Sub-system (IMS) (1) and related network nodes and systems on which the present invention may be implemented. For simplicity only the signaling traffic (3) is shown. The first point of contact for a UE (2) with the IMS (5) is the Proxy Call Session Control Function (P-CSCF) (7), which together with the Serving Call Session Control Function (S-CSCF) (8) forms the Call Session Control Function (CSCF) (6). The P-CSCF is accessed via the Packet Data Network (PDN) Gateway (PGW) (4). The P-CSCF (7) receives requests from the UE (2) and transfers the requests to the S-CSCF (8), which forwards them to the application server (AS) (10). The application server provides the "value-added" services of IMS, such as presence, call forwarding, call barring etc. Control signaling passes from the S-CSCF to the AS and back again, to enable the implementation of these services. The S-CSCF (8) may then transfer signaling to the Breakout Gateway Control Function (BGCF) (9) for transfer to other networks and user equipment, or alternatively to an Interconnection Border Control Function (IBCF) or directly to a destination network. Although for simplicity only one BGCF and one AS are shown, both multiple BGCF's and multiple application servers may be used.

The configuration of IMS services requires communication between the UE and the AS. This is performed over the Ut interface. FIG. 2 is a schematic diagram of this Interface. The Ut interface (11) is a logical interface between the user equipment (2) and an application server (10). This interface enables the user to manage information related to his services, such as creation and assignment of Public Service Identities, management of authorization policies that are used e.g. by Presence service, conference policy management, call barring, call forwarding etc.

The configuration of such services requires signaling across the Ut interface between the UE and the AS. FIG. 3 is a signalling diagram showing the signalling sequence between a user equipment (2) and an application server (10) when an IMS supplementary service configuration is changed. The first step (12) comprises an HTTP GET message sent by the UE to the AS. This is a request for the current supplementary service settings. This request is rejected as unauthorised by the AS using an HTTP 401 UNAUTHORISED message (13). This is essentially a request for authentication. This is provided in a second HTTP GET message (14), which contains the requested authentication and allows the AS to proceed with the request. The AS responds with an HTTP 200 (OK) message (15). This message comprises the current settings for the supplementary service. On receipt of the HTTP OK message, the UE responds with an HTTP PUT message (16), containing the new configuration settings in an XML document. This is transmitted to the AS, which responds with an HTTP OK message (17).

Figure 4:
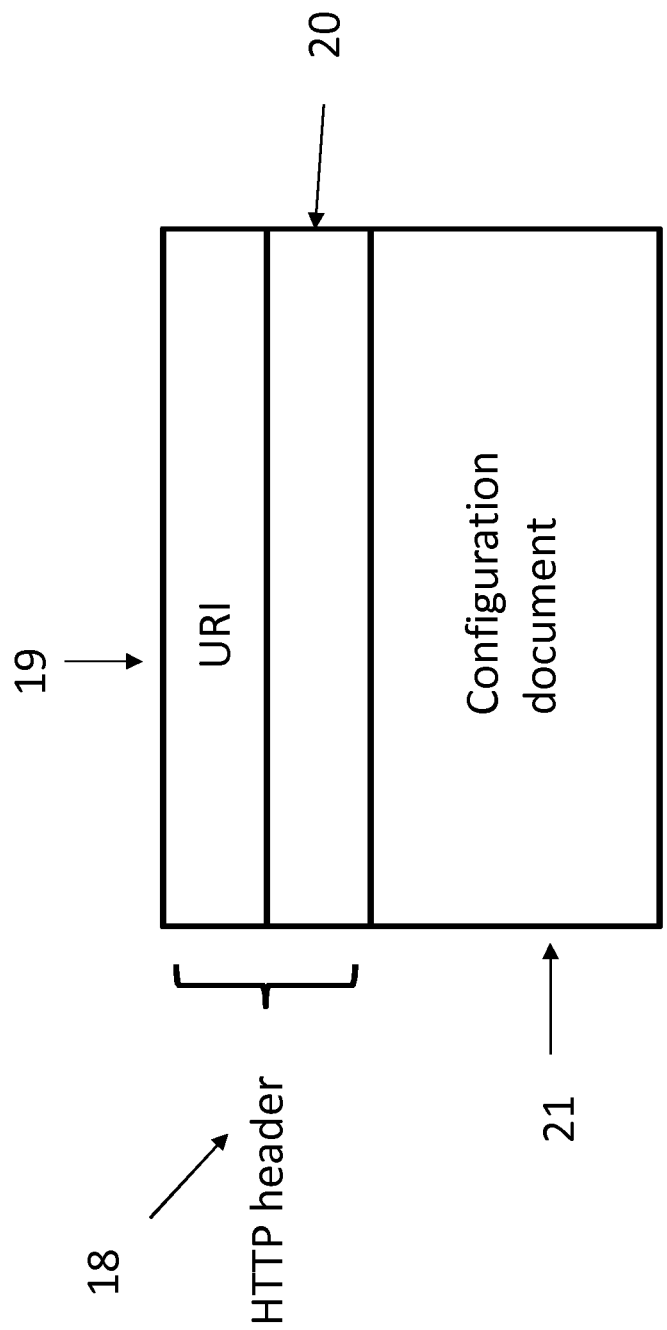
FIG. 4 is a typical layout of an XCAP message comprising a configuration document.

In an embodiment, the access code is incorporated into an HTTP header. In another embodiment, the access code is incorporated into the Uniform Resource Indicator, URI. FIG. 4 shows a typical layout of a layout of an Extensible Mark-up Language (XML) Configuration Access Protocol (XCAP) message. The message comprises HTTP headers (18), comprising the URI (19) and the remaining header (20). In addition to the header, an XCAP message, as used in an embodiment, comprises a configuration document (21).

Figure 5:
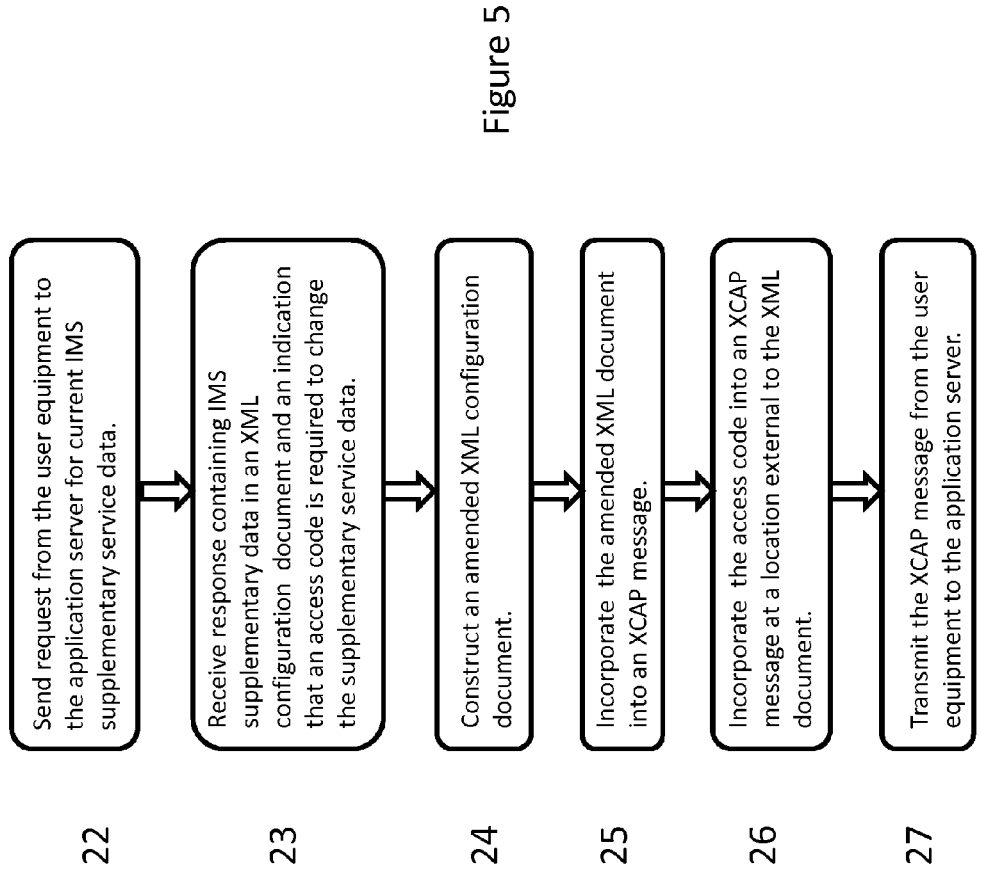
FIG. 5 is a flowchart of a method implemented at a user equipment according to an embodiment.
Figure 6:
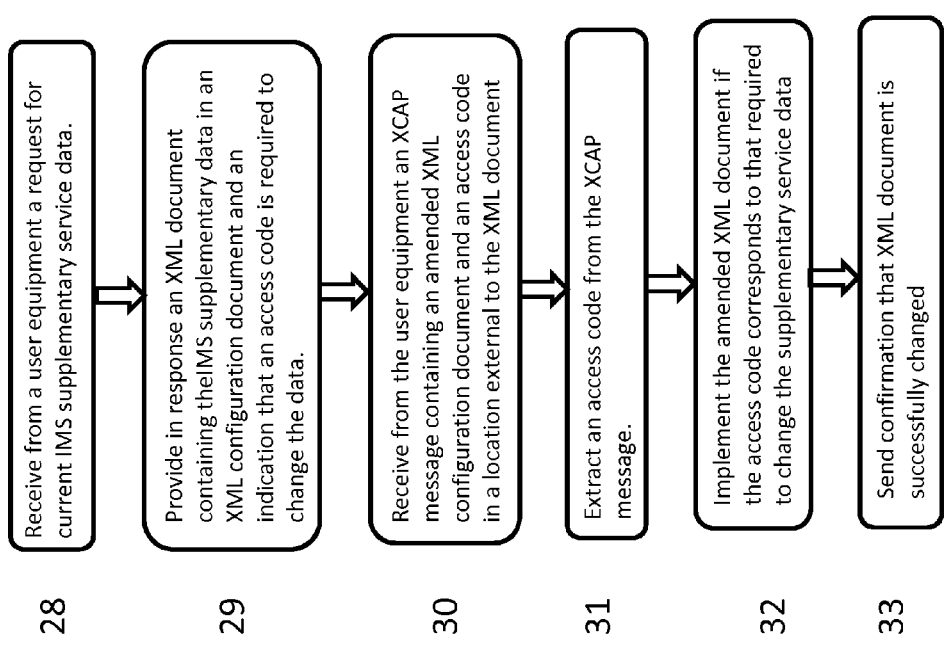
FIG. 6 is a flowchart of a method implemented at an application server according to an embodiment.

The authentication of a user using the method of the present invention commences with a user attempting to access a supplementary service in an IMS. The first step of this access process begins with the user equipment retrieving from the application server the current settings held in the configuration document for the service. On receipt of the request, the application server provides the configuration data in the form of an XML document, together with an indication that an access code is required to modify the service data. FIGS. 5 and 6 are flow charts which illustrate the steps in the method according to an embodiment, which take place at the user equipment and the application server respectively. Referring to FIG. 5, the first step (22) consists of sending a request from the user equipment to the application server to ask for the current supplementary service data. When a response is received (23) with a copy of the XML configuration document presently stored at the server and an indication that an access code is required to change the supplementary service data, the user constructs (24) an amended XML document and incorporates (25) the XML document into an XCAP message. In addition to XML document, the required access code is incorporated into this message (26) and the message is then transmitted (27) to the application server. In an embodiment, the access code is incorporated into the Uniform Resource Indicator (URI). In another embodiment, the access code is provided in the XCAP User Identity, XUI. In yet another embodiment the access code is provide in another part of the HTTP header. The person skilled in the art will appreciate that there are many alternative methods of sending the access code, so long as it is not within the XML document itself. Subject to this and the requirement that the access code not be stored in a manner to which all users have access, the invention is not limited to any one method for providing the access code. For example, in an alternative embodiment, separate XCAP messages may be used for sending the access code and the XML configuration document.

FIG. 6 is a flow chart illustrating the steps that take place at the application server. The server receives (28) from a user equipment a request for its current supplementary service data. In response, the application server provides (29) an XML document containing the supplementary service data, together with a indication that a password is required to change the service data. On receipt of an XCAP message (30) containing an amended XML configuration document, the application server extracts (31) the access code and, if the access code corresponds to that required for changing the supplementary service configuration, the application server implements (32) the XML document. In an embodiment, the application server stores the code as a hash of the access code. When an access code is provided, the hash function is applied to the received access code and if the output of the hash function is the same as the hash value stored by the server, the access code is considered to be correct and the requested changes to the supplementary service data are accepted. In an embodiment, an MD-5 hash is used. The person skilled in the art will appreciate that there are many different options for storing and processing the access code and the invention is not limited to any one method. If the access code is correct, then in an embodiment, the process is completed by the sending (33) of a confirmation that a successful change in the XML document has been made. In an embodiment, this is performed by means of an HTTP 200 (OK) message. In an embodiment, if the access code is not correct, or it is missing, then an indication of this is sent to the user equipment. In an embodiment this is performed using an HTTP 409 (conflict) response. In an embodiment, an explicit indication that an access code is required. In an embodiment, this would use the extension method described in the IETF standard RFC 4825. The person skilled in the art will appreciate that there are many different options for indicating to the user that an access code is needed or that the access code provided is incorrect, and the invention is not limited to any one method.

Figure 7:
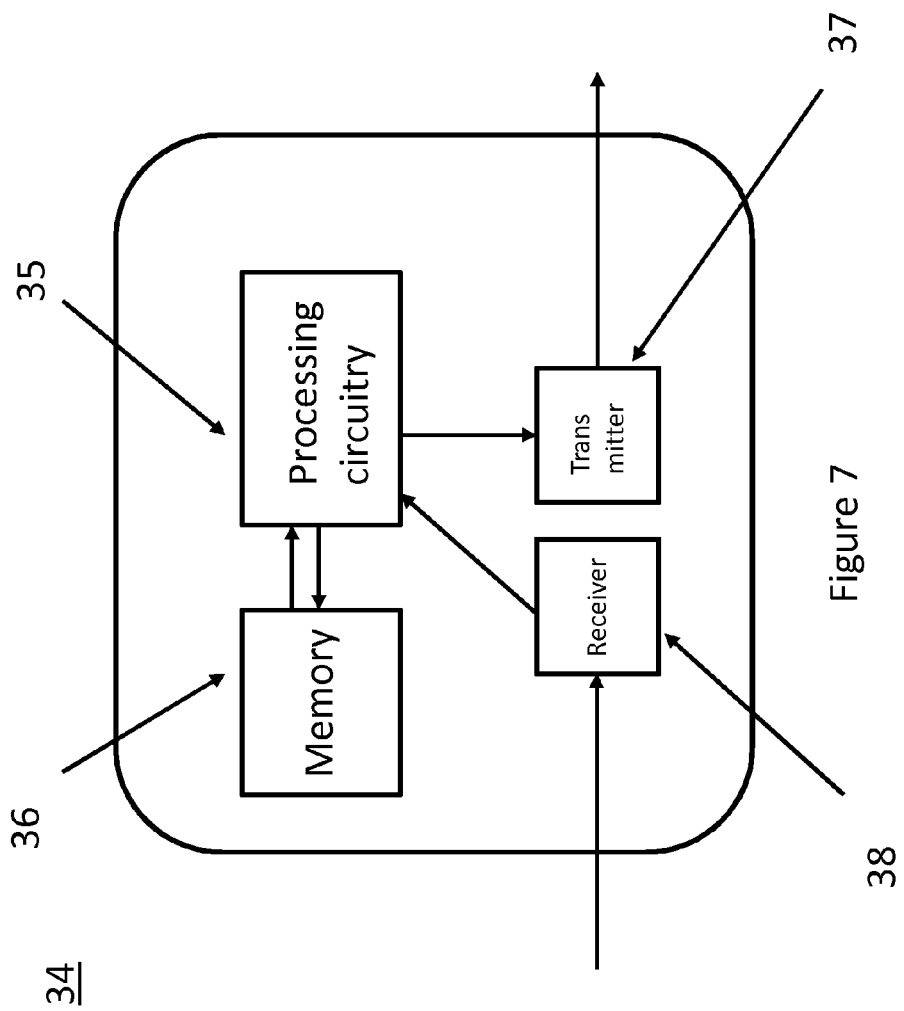
FIG. 7 is a schematic diagram of apparatus according to an embodiment for use in a user equipment.

FIG. 7 is a schematic diagram illustrating a typical arrangement for apparatus (34) in user equipment for implementing a method according to the invention. It comprises processor circuitry (35), a storage unit (36) for storing instructions executable by the processor circuitry, transmitter (37) and receiver (38).

Figure 8:
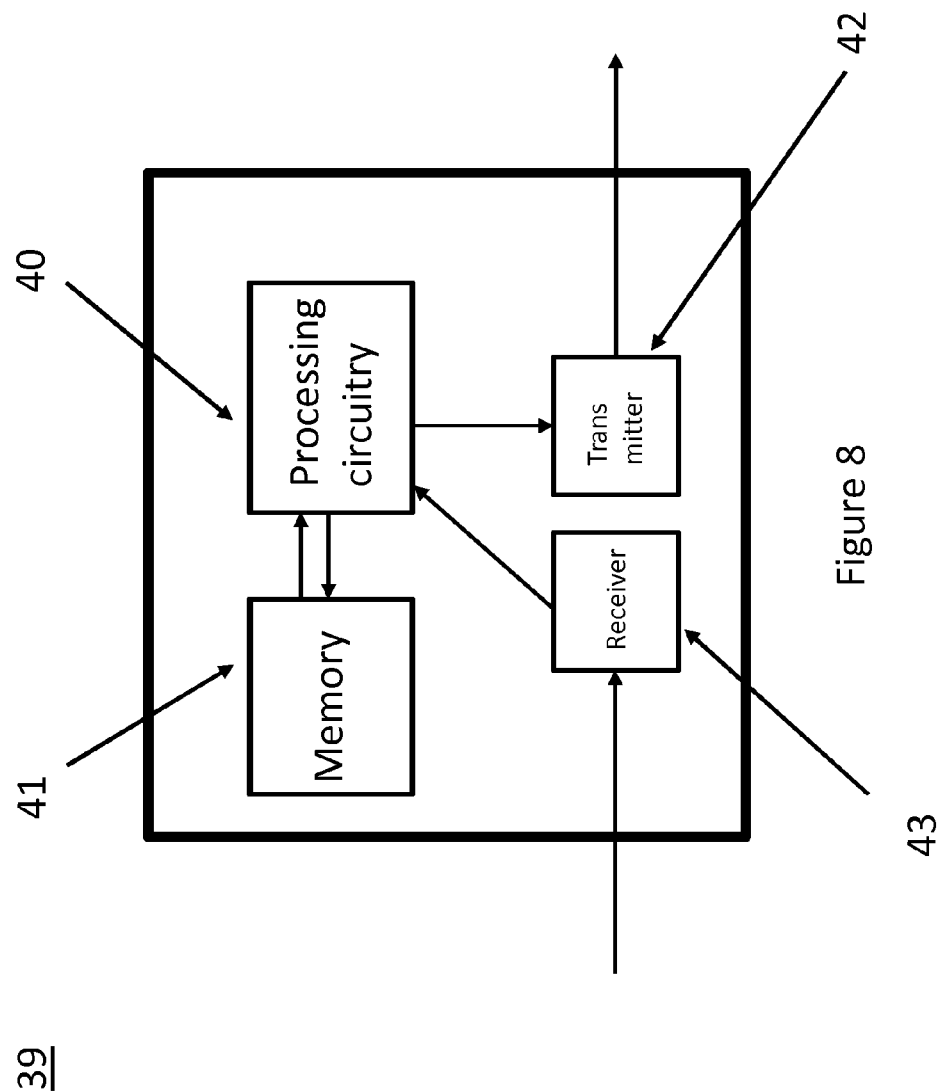
FIG. 8 is a schematic diagram of apparatus according to an embodiment for use in an application server.

The corresponding application server apparatus (39) is illustrated schematically in FIG. 8. This apparatus comprises processor circuitry (40), a storage unit (41) for storing instructions executable by the processor circuitry, a transmitter (42) and a receiver (43).

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of authenticating a request to change Internet Protocol Multimedia Sub-system (IMS) supplementary service data stored at an application server within an IMS network, the method comprising:
   sending from a user equipment to the application server a request for current IMS supplementary service data;
   on receipt by the user equipment of a response containing the IMS supplementary data in an XML configuration document, and an indication to a user that an access code is required to change the supplementary service data, wherein the access code is a passcode or personal identification number (PIN) that identifies the user:
   constructing an amended XML configuration document;
   incorporating the amended XML document into an Extensible Mark-up Language, XML, Configuration Access Protocol, XCAP, message;
   incorporating an access code into the XCAP message at a location external to the XML document; and
   transmitting the XCAP message from the user equipment to the application server.

2. A method as claimed in claim 1, further comprising the steps of:
   receiving at the application server the request for current IMS supplementary service data;
   providing in the response to the request the IMS supplementary data in an XML configuration document and an indication that an access code is required to change the supplementary service data;
   receiving at the application server the XCAP message containing the amended XML document and an access code in a location external to the XML document;
   extracting from the XCAP message the access code; and
   implementing the amended XML document, if the access code corresponds to a code required for changing the supplementary service data.

3. A method as claimed in claim 1, wherein the access code is in an HTTP header.

4. A method as claimed in claim 1, wherein the access code is part of a Uniform Resource Indicator (URI).

5. A method as claimed in claim 1, wherein the access code is part of the XCAP User Identity (XUI).

6. A method as claimed in claim 1, wherein the access code is provided across a Ut interface.

7. A method as claimed in claim 1, wherein a service framework of the supplementary service is Multimedia Telephony Services.

8. A method as claimed in claim 1, further comprising storing a hash of the access code at the application server and, on receipt of an access code, comparing a hash of the received code with a hash of the stored code.

9. An apparatus for use in a User Equipment (UE) comprising:
processor circuitry;
a storage unit storing instructions executable by the processor circuitry;
a transmitter; and
a receiver, whereby the apparatus is operative to:
send to an application server a request for current IMS supplementary service data;
receive a response containing the Internet Protocol Multimedia Sub-system (IMS) supplementary service data in an XML configuration document, and an indication to a user that an access code is required to change the supplementary service data, wherein the access code is a passcode or personal identification number (PIN) that identifies the user;
construct an amended XML configuration document;
incorporate the amended XML document into an Extensible Mark-up Language, XML, Configuration Access Protocol, XCAP, message;
incorporate an access code into the XCAP message at a location external to the XML document; and
transmit the XCAP message from the user equipment to the application server.

10. The apparatus as claimed in claim 9, configured to incorporate the access code into an HTTP header.

11. The apparatus as claimed in claim 9, configured to incorporate the access code into a Uniform Resource Indicator (URI).

12. The apparatus as claimed in claim 9, configured to incorporate the access code into an XCAP User Identity (XUI).

13. A user equipment comprising an apparatus as claimed in claim 9.

14. An apparatus for use in an application server (AS) comprising: processor circuitry; a storage unit storing instructions executable by the processor circuitry, a transmitter and a receiver, whereby the user equipment is operative to:

receive a request from a user equipment for current IMS supplementary service data;
provide a response containing the Internet Protocol Multimedia Sub-system (IMS) supplementary service data in an XML configuration document, and an indication to a user that an access code is required to change the supplementary service data, wherein the access code is a passcode or personal identification number (PIN) that identifies the user;
receive an XCAP message containing an amended XML document and an access code located in the XCAP message external to the XML document;
extract from the XCAP message the access code; and
implement the amended XML document, if the access code corresponds to a code required for changing the supplementary service data.

15. The apparatus as claimed in claim 14, further configured to store a hash of the access code at the application server and, on receipt of an access code, compare a hash of the received code with the hash of the stored code.

16. The apparatus as claimed in claim 14 further configured to:
determine whether a correct access code has been provided; and
if no correct access code has been provided:
transmit to the UE a message indicating a conflict.

17. The apparatus as claimed in claim 14, configured to extract the access code from an HTTP header.

18. The apparatus as claimed in claim 14, configured to extract the access code from a Uniform Resource Indicator (URI).

19. The apparatus as claimed in claim 18, configured to extract the access code from an XML User Identity (XUI).

20. An application server comprising an apparatus as claimed in claim 14.

21. A non-transitory computer-readable medium, comprising instructions which, when executed on at least one processor, cause the at least one processor to carry out a method according to claim 1.

* * * * *